US012664318B2

(12) United States Patent (10) Patent No.: US 12,664,318 B2
Oh et al. (45) Date of Patent: Jun. 23, 2026

(54) ELECTRONIC DEVICE FOR RECOVERING BLOCK DATA IN BLOCKCHAIN NETWORK AND OPERATION METHOD THEREOF

(71) Applicant: Samsung Electronics Co., Ltd., Suwon-si (KR)

(72) Inventors: Byeongyun Oh, Suwon-si (KR); Yongjoon Kim, Suwon-si (KR); Namkun Kim, Suwon-si (KR); Dohyun Jo, Suwon-si (KR); Jinsu Jo, Suwon-si (KR); Seungmin Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 256 days.

(21) Appl. No.: 18/299,991

(22) Filed: Apr. 13, 2023

(65) Prior Publication Data

US 2023/0252191 A1 Aug. 10, 2023

Related U.S. Application Data

(63) Continuation of application No. PCT/KR2022/013621, filed on Sep. 13, 2022.

(30) Foreign Application Priority Data

Sep. 29, 2021 (KR) ........................ 10-2021-0129076

(51) Int. Cl.
*G06F 21/64* (2013.01)
*H04L 9/00* (2022.01)
*H04L 9/32* (2006.01)
(52) U.S. Cl.
CPC ............ *G06F 21/64* (2013.01); *H04L 9/3239* (2013.01); *H04L 9/50* (2022.05)

(58) Field of Classification Search
CPC .......... G06F 21/64; G06F 11/14; G06F 16/27; G06F 11/1471; G06F 11/1448;
(Continued)

(56) References Cited

U.S. PATENT DOCUMENTS 10,382,205 B1 8/2019 Ko
10,901,957 B2 1/2021 Natarajan et al.
(Continued)

FOREIGN PATENT DOCUMENTS

CN 107423152 B 5/2019
CN 111475576 A 7/2020
(Continued)

OTHER PUBLICATIONS

International Search Report dated Jan. 2, 2023, issued in International Application No. PCT/KR2022/013621.
(Continued)

*Primary Examiner* — Lynn D Feild
*Assistant Examiner* — Vladimir I Gavrilenko
(74) *Attorney, Agent, or Firm* — Jefferson IP Law, LLP

(57) ABSTRACT

An electronic device constituting a block node included in a blockchain network is provided. The method for operating an electronic device includes, in response to a request for recovery of loss of data stored in a memory, requesting user node information relating to a user of the electronic device from an external device through a communication circuit, receiving the user node information acquired based on node identification information stored in the external device, requesting block data associated with the user from the external device, based on the user node information, acquiring at least one block detected based on the node information, among the entire ledger, from the external device through the communication circuit, and storing the at least one acquired block in the memory.

19 Claims, 8 Drawing Sheets

(58) Field of Classification Search
CPC ...... G06F 11/1489; H04L 9/3239; H04L 9/50;
H04L 65/40; H04L 67/10; H04L 63/12
See application file for complete search history.

(56) References Cited

U.S. PATENT DOCUMENTS

| | | | |
|---|---|---|---|
| 10,922,195 | B2 | 2/2021 | Yang |
| 11,055,709 | B2 * | 7/2021 | Liu ....................... H04L 9/3218 |
| 11,860,858 | B1 * | 1/2024 | McKervey ............ H04L 9/3297 |
| 2017/0358041 | A1 * | 12/2017 | Forbes, Jr. .............. G05D 3/12 |
| 2018/0294956 | A1 | 10/2018 | O'Brien et al. |
| 2020/0334110 | A1 | 10/2020 | Song et al. |
| 2020/0356969 | A1 * | 11/2020 | Cho ..................... G06Q 20/145 |
| 2020/0387433 | A1 * | 12/2020 | Wang .................. G06F 16/2365 |
| 2021/0081557 | A1 | 3/2021 | Thomson-Wood et al. |
| 2021/0091924 | A1 * | 3/2021 | Holmberg ............ G06Q 20/065 |
| 2021/0135932 | A1 * | 5/2021 | Motylinski ............. H04L 47/11 |
| 2021/0216628 | A1 * | 7/2021 | Kutner ................ G06F 11/1458 |
| 2022/0165384 | A1 * | 5/2022 | Jibaja .................... G16H 10/60 |
| 2022/0366088 | A1 * | 11/2022 | Grover ................... G06F 21/64 |
| 2022/0413971 | A1 * | 12/2022 | Qian ................... G06F 11/1464 |
| 2023/0039832 | A1 | 2/2023 | Kim |
| 2023/0360040 | A1 * | 11/2023 | Childe ................ G06Q 20/108 |
| 2024/0013207 | A1 * | 1/2024 | Jacquet ............... G06Q 20/389 |

FOREIGN PATENT DOCUMENTS

| | | | |
|---|---|---|---|
| CN | 111708657 | A | 9/2020 |
| CN | 112015596 | B | 5/2021 |
| JP | 2023-524841 | A | 6/2023 |
| JP | 2023-531695 | A | 7/2023 |
| KR | 10-2010-0053784 | A | 5/2010 |
| KR | 10-2019-0099365 | A | 8/2019 |
| KR | 10-2041911 | B1 | 11/2019 |
| KR | 10-2019-0140144 | A | 12/2019 |
| KR | 10-2110733 | B1 | 5/2020 |
| KR | 10-2124049 | B1 | 6/2020 |
| KR | 10-2020-0122724 | A | 10/2020 |
| KR | 10-2021-0010044 | A | 1/2021 |
| KR | 10-2208891 | B1 | 1/2021 |
| KR | 10-2022-0086677 | A | 6/2022 |
| KR | 10-2023-0021944 | A | 2/2023 |

OTHER PUBLICATIONS

Korean Office Action with English translation dated Feb. 22, 2026;
Korean Appln. No. 10-2021-0129076.

* cited by examiner

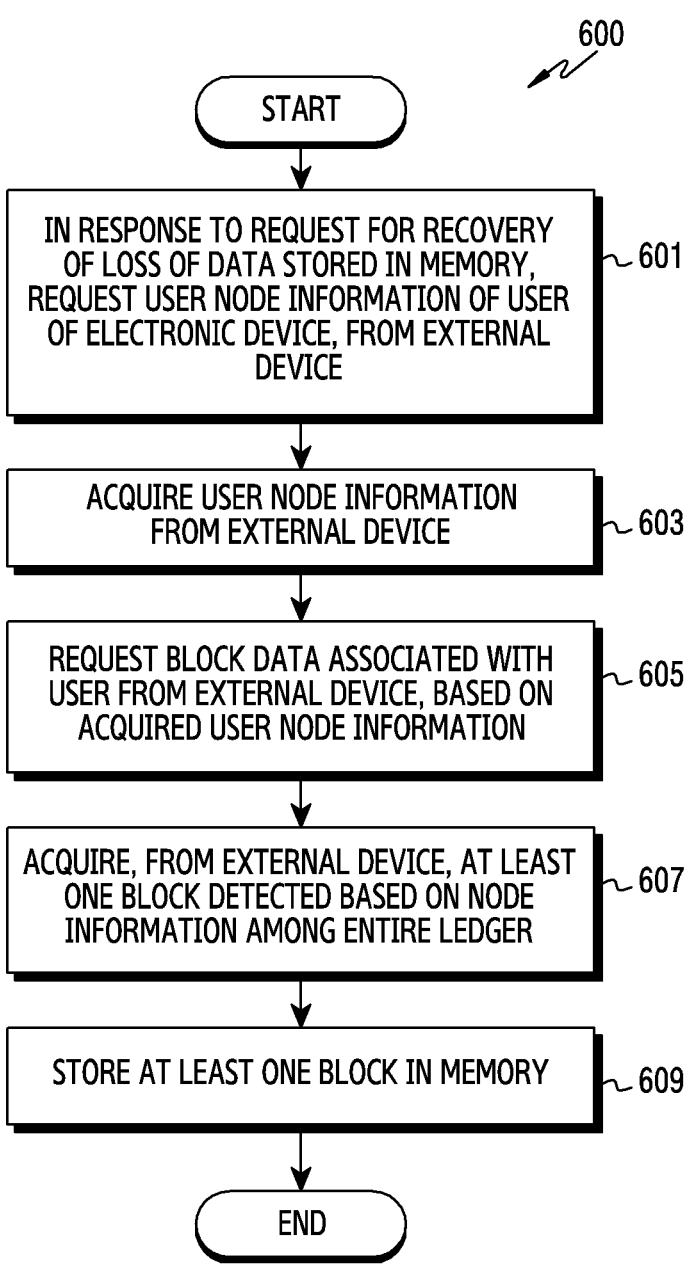

600

START

IN RESPONSE TO REQUEST FOR RECOVERY OF LOSS OF DATA STORED IN MEMORY, REQUEST USER NODE INFORMATION OF USER OF ELECTRONIC DEVICE, FROM EXTERNAL DEVICE ~ 601

ACQUIRE USER NODE INFORMATION FROM EXTERNAL DEVICE ~ 603

REQUEST BLOCK DATA ASSOCIATED WITH USER FROM EXTERNAL DEVICE, BASED ON ACQUIRED USER NODE INFORMATION ~ 605

ACQUIRE, FROM EXTERNAL DEVICE, AT LEAST ONE BLOCK DETECTED BASED ON NODE INFORMATION AMONG ENTIRE LEDGER ~ 607

STORE AT LEAST ONE BLOCK IN MEMORY ~ 609

END

FIG.6

ELECTRONIC DEVICE FOR RECOVERING BLOCK DATA IN BLOCKCHAIN NETWORK AND OPERATION METHOD THEREOF

CROSS-REFERENCE TO RELATED APPLICATION(S)

This application is a continuation application, claiming priority under § 365(c), of an International application No. PCT/KR2022/013621, filed on Sep. 13, 2022, which is based on and claims the benefit of a Korean patent application number 10-2021-0129076, filed on Sep. 29, 2021, in the Korean Intellectual Property Office, the disclosure of which is incorporated by reference herein in its entirety.

TECHNICAL FIELD

The disclosure relates to an electronic device connected to a blockchain network and controlling execution of a blockchain-related function, and an operation method thereof. More particularly, the disclosure relates to an electronic device for recovering lost block data in a blockchain network including block nodes having partial ledgers, and an operation method thereof.

BACKGROUND ART

A blockchain network refers to a network distinguished from a centralized network in which decision making is performed by a central server, and is represented as a "decentralized network". The blockchain network may refer to a network in which decision making is performed according to an algorithm of consensus among nodes participating in the blockchain network.

A distributed ledger existing in the blockchain network may include one or more blocks generated based on a transaction executed in the blockchain network, and a database storing data related to the transaction. The distributed ledger may be stored by each node participating in the blockchain network. The distributed ledger existing in the blockchain network may be updated according to an algorithm of consensus among nodes participating in the blockchain network. The distributed ledger may include blocks connected to each other and each including data of at least one transaction. The connection between the blocks may be represented as a blockchain.

The above information is presented as background information only to assist with an understanding of the disclosure. No determination has been made, and no assertion is made, as to whether any of the above might be applicable as prior art with regard to the disclosure.

DISCLOSURE

Technical Problem

A blockchain network may include block nodes for validating a blockchain system. The block nodes include electronic devices.

Electronic devices constituting a block node in a blockchain network are required to store, maintain, and manage data of a blockchain to keep integrity of a block included in the blockchain. There is no problem in a case wherein data of the blockchain has a large size, but the size of data of the entire blockchain gradually increases as the number of blocks increases. Accordingly, the electronic device may have a problem of maintaining and managing large capacity data. When the electronic device is a personal mobile device, there is a problem of failing to reach such a level of performance.

In addition, to reduce a data burden, the electronic device may store and maintain a part of the data of the entire blockchain in a device. For example, the electronic device may store, in the device, a partial ledger including at least a part of a distributed ledger of the blockchain network. In this case, when the part of the data of the blockchain is lost, it is difficult to recover the lost data.

Aspects of the disclosure are to address at least the above-mentioned problems and/or disadvantages and to provide at least the advantages described below. Accordingly, an aspect of the disclosure is to provide an electronic device for recovering lost block data in a blockchain network including block nodes having partial ledgers, and an operation method thereof.

Additional aspects will be set forth in part in the description which follows and, in part, will be apparent from the description, or may be learned by practice of the presented embodiments.

Technical Solution

In accordance with an aspect of the disclosure, an electronic device constituting a block node included in a blockchain network is provided. The electronic device includes a communication circuit configured to transmit or receive a signal to or from an external device having an entire ledger for the blockchain network, wherein the entire ledger includes at least one block including node information relating to at least one block node included in the blockchain network, the at least one block node having consented to block generation, a memory, and at least one processor electrically connected to the communication circuit and the memory, wherein the processor is configured to, in response to a request for recovery of loss of data stored in the memory, request user node information relating to a user of the electronic device from the external device through the communication circuit, receive the user node information acquired based on node identification information stored in the external device, request block data associated with the user from the external device, based on the user node information, acquire at least one block detected based on the node information, among the entire ledger, from the external device through the communication circuit, and store the at least one acquired block in the memory.

In accordance with another aspect of the disclosure, a method for operating an electronic device constituting a block node included in a blockchain network is provided. The method includes, in response to a request for recovery according to loss of data stored in a memory included in the electronic device, requesting user node information relating to the electronic device from an external device, receiving the user node information acquired based on node identification information stored in the external device, requesting block data associated with a user from the external device, based on the user node information, acquiring at least one block detected based on the node information, among an entire ledger of the blockchain network, from the external device, wherein the entire ledger includes the node information relating to at least one block node included in the blockchain network, the at least one block node having consented to block generation, and storing the at least one block in the memory.

Advantageous Effects

An electronic device according to various embodiments of the disclosure can establish a blockchain network with external electronic devices. In this case, the electronic device can store a partial ledger rather than the entire ledger of a distributed ledger of the blockchain network.

An electronic device according to various embodiments of the disclosure can store, in a memory, a partial ledger rather than the entire ledger, and can efficiently use the memory when storing the partial ledger.

An electronic device according to various embodiments of the disclosure can store lost data when a part of the data of the blockchain, stored in the memory, is lost.

Advantageous effects obtainable in the disclosure are not limited to the above-mentioned effects, and other unmentioned effects can be clearly understood from the description below by those skilled in the art to which the disclosure belongs to.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 6 is a flowchart illustrating an operation of recovering lost block data by an electronic device according to an embodiment of the disclosure;

The same reference numerals are used to represent the same elements throughout the drawings.

MODE FOR INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
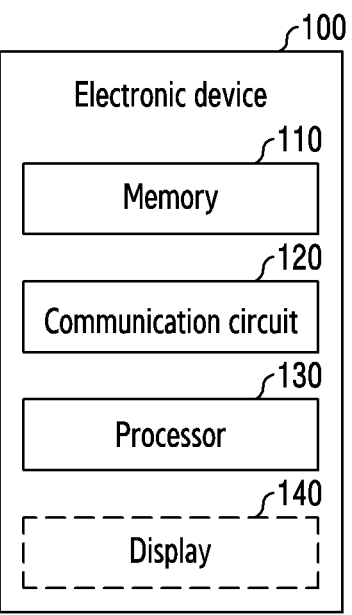
FIG. 1 is a block diagram illustrating an electronic device according to an embodiment of the disclosure.

FIG. 1 is a block diagram illustrating an electronic device according to an embodiment of the disclosure.

Referring to FIG. 1, an electronic device 100 may include a memory 110, a communication circuit 120, a processor 130, and a display 140, or a combination thereof. According to various embodiments, the electronic device 100 may include additional elements other than the elements illustrated in FIG. 1, or may omit at least one of the elements illustrated in FIG. 1.

The memory 110 may store instructions which when executed, cause the processor 130 to process data for performing operations of the electronic device 100, or control elements of the electronic device 100. The memory 110 may include a security area or a separate security storage medium (e.g., a security memory area (e.g., a trust zone) which is accessible through a security OS only). The memory 110 may include at least one blockchain application performing a blockchain-related operation. For example, the memory may include a blockchain platform corresponding to a blockchain module or a blockchain application performing a blockchain-related operation.

The memory 110 may include a distributed ledger for a blockchain network. For example, when the electronic device 100 corresponds to a server node in the blockchain network, the memory 110 may store the entirety of the distributed ledger for the blockchain network. The entirety of the distributed ledger may be represented as an entire ledger. In another example, when the electronic device 100 corresponds to a mobile node in the blockchain network, the memory 110 may store a partial ledger including a part of the distributed ledger for the blockchain network. The part of the distributed ledger, distinguished from the entire ledger, may be represented as a partial ledger.

The distributed ledger may include a state database and at least one block including at least one transaction in the blockchain network.

Data stored in the state database may be represented as state data. The state data may mean, for example, data stored in a world state corresponding to a database used in Hyperledger Fabric. However, the state data is not limited thereto. The state database may execute a transaction and store changed final values in a key-value format. The state data stored in the state database may have a characteristic of a global variable in the blockchain network. Accordingly, the state database may be identified to identify final values by execution of a transaction in the blockchain network.

The electronic device 100 may connect at least one block and store the at least one block in the memory 110. For example, the electronic device 100 may store, in the memory 110, a blockchain to which the at least one block is connected. Each of the at least one block included in the blockchain may include related block information, a hash field, and block data. For example, the hash field may include previous block information in the distributed ledger in the blockchain network. Each of the at least one block may be connected based on the previous block information included in the hash field. The block data may include transaction data of the corresponding block. The related block information may include node information of block nodes participating in transaction consensus about the corresponding block. In addition, the related block information may include the previous block information in the partial ledger included in each block node.

Each of the at least one block included in the blockchain may include a block header and transaction data. The hash field may be included in the block header. The block header may include at least one of a hash value of a header and data area, a hash value of a previous block, a height value of a block indicating the number of blocks generated from a genesis block, a hash value of word state data after performing the transaction included in the block, a public key of a block generator, a value obtained by signing a hash with a private key of the block generator, and a value obtained by signing a hash value with an attestation key certificate chain or an attestation key. The genesis block may mean a block initially generated in the blockchain network.

The block data may include at least one of a hash value of at least a part of transaction data, version information of a smart contract, smart contract ID, a smart contract function ID, smart contract data corresponding to a factor value required for a smart contract function, a nonce value corresponding to a transaction generation number of a transaction generator, a public key of the transaction generator, a value obtained by signing a hash value with a private key of the transaction generator, and a value obtained by signing a hash value with an attestation key certification chain or an attestation key.

The communication circuit 120 may be configured to be connected to an external device and transmit or receive data. For example, the communication circuit 120 may transmit or receive data to or from at least one external electronic device. The communication circuit 120 may communicate with various external servers. For example, the electronic device 100 may transmit data to the external server and receive a response from the external server by using the communication circuit 120.

The electronic device 100 may form a blockchain network with at least one external device through the communication circuit 120. The blockchain network may include at least one external device and the electronic device 100 as blockchain nodes. Accordingly, the electronic device 100 and/or the at least one external device may perform roles of both a node and a client. In The electronic device 100 may transmit or receive data to or from one or more external devices included in the blockchain network through the communication circuit 120, and participate in transaction consensus in the blockchain network.

The blockchain network may include a server node and/or a mobile node as a blockchain node. According to various embodiments, the server node and/or the mobile node may correspond to the electronic device 100 and/or the external electronic device, and may indicate a portable electronic device. For example, the electronic device 100 and/or the external electronic device may correspond to a mobile phone, a tablet PC, and/or a laptop computer. A description of the blockchain network according to various embodiments is made below with reference to FIG. 2.

The processor 130 may be electrically or operatively connected to the memory 110, the communication circuit 120, and the display 140. The processor 130 may execute computation or data processing for communication and/or control of one or more other elements of the electronic device 100 by using instructions stored in the memory 110. The processor 130 may include at least one of a central processing unit (CPU), a graphics processing unit (GPU), a microcontroller unit (MCU), a sensor hub, a supplementary processor, a communication processor, an application processor, an application specific integrated circuit (ASIC), and a field programmable gate array (FPGA), and may have multiple cores.

The processor 130 may perform an operation related to a blockchain through a blockchain application or a blockchain platform stored in the memory 110. As a transaction is executed in the blockchain network, the processor 130 may generate a block including a hash field, related block information, and block data. The hash field may include previous block information in the distributed ledger. The related block information may include information on block nodes associated with transaction generation, and the previous block information in the partial ledger stored in the memory 110 of each of the block nodes. The block data may include information on the transaction. The block may be confirmed through consensus with nodes included in the blockchain network through the communication circuit 120. The processor 130 may store the block confirmed through the consensus, in the memory 110.

The display 140 may display various contents (e.g., text, image, video, icon, and/or symbol). The display 114 may include a liquid-crystal display (LCD), a light-emitting diode (LED) display, or an organic light-emitting diode (OLED) display. The processor 130 may display various contents related to the blockchain application through the display 140.

When data stored in the memory 110 is lost, the processor 130 may request, from an external device, node identification information relating to a user of the electronic device 100, through the communication circuit 120. For example, the processor 130 may identify that at least a part of the data included in the distributed ledger stored in the memory 110 has been lost. In addition, the processor 130 may request, from the external device, node identification information of the user in response to a data recovery request of the user according to the data loss. The electronic device 100 may request, from the external device, node identification information based on a user account in the blockchain network. In this case, the external device may correspond to a block node storing node identification information including information on a user included in the blockchain network and a block node associated with the user.

The processor 130 may acquire the node identification information from the external device, and request, from the external device, block data associated with the user, based on the acquired node identification information. For example, the processor 130 may determine a block node that is associated with the user in the blockchain network, based on the node identification information, and request, from the external device, block data associated with the block node. In this case, the external device may correspond to a server node including the entire ledger.

The processor 130 may acquire at least one block detected based on the node information included in the block of the entire ledger from the external ledger through the communication circuit 120. The external device may search for a blockchain of the entire ledger stored in the external device in response to a block data request. For example, the external device may search for node information included in each of the at least one block included in the blockchain, and detect a block associated with the electronic device 100. Accordingly, the external device may transfer the at least one detected block to the electronic device 100.

The processor 130 may store the at least one block acquired from the external device in the memory 110. For example, the processor 130 may associate the at least one block with the blockchain included in the distributed ledger and store the at least one block, and may update the state database based on the at least one block.

Figure 2:
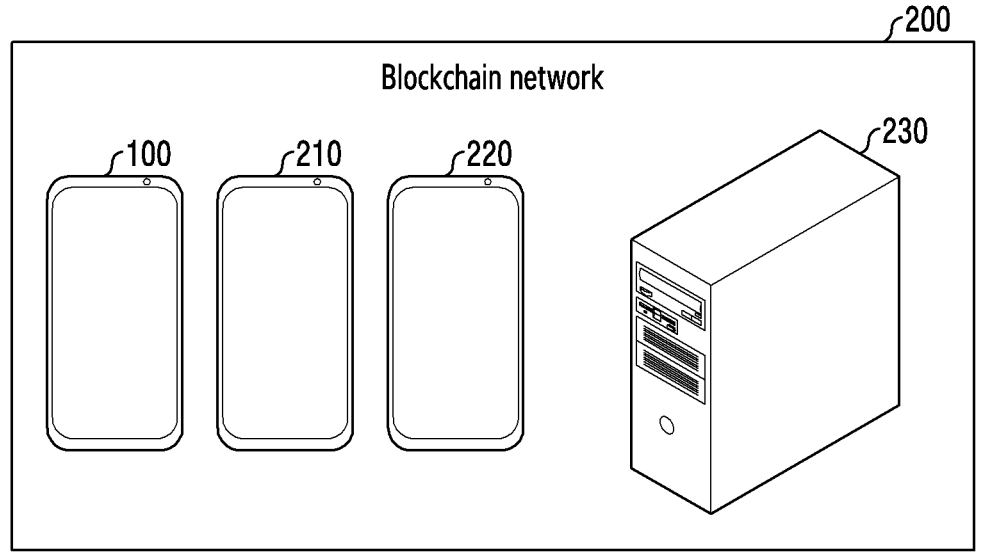
FIG. 2 illustrates a blockchain network according to an embodiment of the disclosure.

FIG. 2 illustrates a blockchain network according to an embodiment of the disclosure.

Referring to FIG. 2, a blockchain network 200 may include multiple electronic devices 100, 210, 220, and 230. The multiple electronic devices 100, 210, 220, and 230 included in the blockchain network 200 may include portable electronic devices. For example, the multiple electronic devices 100, 210, 220, and 230 may correspond to a mobile, a table PC, and/or a laptop computer. The electronic device 100, the first external device 210, and the second external device 220 may be portable mobile nodes, and the third external device 230 may be a server node. The blockchain network 200 may include multiple server nodes similar to the third external device 230.

The multiple electronic devices 100, 210, 220, and 230 may include elements similar to the elements of the electronic device 100. For example, the multiple electronic devices 100, 210, 220, and 230 may include elements for performing operations required in the blockchain network, and communication with each other.

For convenience of description, embodiments of the disclosure describe that the blockchain network includes four electronic devices, but the various embodiments of the disclosure are not limited thereto.

The third external device 230 may be a server node. The third external device 230 functioning as a server node may store the entire ledger of the blockchain network 200. The third external device 230 may generate all transactions and block recording in the blockchain network 200. For example, the third external device 230 may store, in the memory, block and state data of all transactions of the blockchain network 200. Accordingly, the third external device 230 may store, in the memory, the entire ledger corresponding to the distributed ledger in the blockchain network 200.

The third external device 230 functioning as the server node may include information on block nodes included in the blockchain network 200. The third external device 230 may include a user of the blockchain network 200 and block node information of the user. For example, the third external device 230 may include node identification information including information on the user of the blockchain network 200 and a device registered by the user. The node identification information may include a unique value for each of the multiple electronic devices 100, 210, 220, and 230 constituting block nodes in the blockchain network 200, and include the unique value in association with user information of each of the multiple electronic devices 100, 210, 220, and 230.

The electronic device 100, the first external device 210, and/or the second external device 220 may be a mobile node in the blockchain network 200. The electronic device 100, the first external device 210, and/or the second external device 220, functioning as a mobile node, may perform generation of the transaction and block recording in the blockchain network 200. Each of the electronic device 100, the first external device 210, and/or the second external device 220 may include a partial ledger including at least a part of the entire ledger. For example, each of the electronic device 100, the first external device 210, and/or the second external device 220 may participate in transaction consensus, and store, in the memory in the device, block and state data of the related transaction. Accordingly, the electronic device 100, the first external device 210, and/or the second external device 220 may store, in the memory in each device, a partial ledger including block and state data only of a transaction in which each of the electronic device 100, the first external device 210, and/or the second external device 220 participates, among the entire ledger of the blockchain network 200.

Each of the multiple electronic devices 100, 210, 220, and 230 may dependently execute a smart contract for transaction execution, and the smart contract may execute the same program logic for processing the transaction. Nodes included in the blockchain network 200 may be configured to participate only in the execution of the transaction related to the respective devices. For example, the electronic device 100, the first external device 210, and/or the second external device 200 corresponding to mobile nodes, may participate only in the executed of the transaction associated with the respective devices. Unlike this, the server node may participate execution of all transactions.

The multiple electronic devices 100, 210, 220, and 230 may refer to state data stored in the state database stored in the memory for the smart contract. Each of the multiple electronic devices 100, 210, 220, and 230 may execute the smart contract with the state data, and determine whether to execute a transaction through consensus among the multiple electronic devices 100, 210, 220, and 230. For example, it may be determined the consensus has occurred when the same result value is obtained upon the execution of the smart contract for a transaction of each of the multiple electronic devices 100, 210, 220, and 230. According to the execution of the transaction, a block may be generated upon consensus between devices related to the execution of the transaction among the multiple electronic devices 100, 210, 220, and 230. The generated block may be added as a new node, at the end of a blockchain of the distributed ledger stored in each of the devices related to the execution of the transaction. In addition, a key value stored in the state database of devices related to the execution of the transaction, among the multiple electronic device 100, 210, 220, and 230 may be updated by the execution of the transaction.

Each of the blockchain nodes included in the blockchain network 200 may own the entire ledger or a partial ledger. The distributed ledger of the blockchain network 200 may have a structure similar to that of the distributed ledger described with reference to FIG. 1. Each of the at least one block included in each ledger may be connected by using a hash field, and when different distributed ledgers are found, the blockchain nodes may doubt reliability and validity of the corresponding block.

Figure 3:
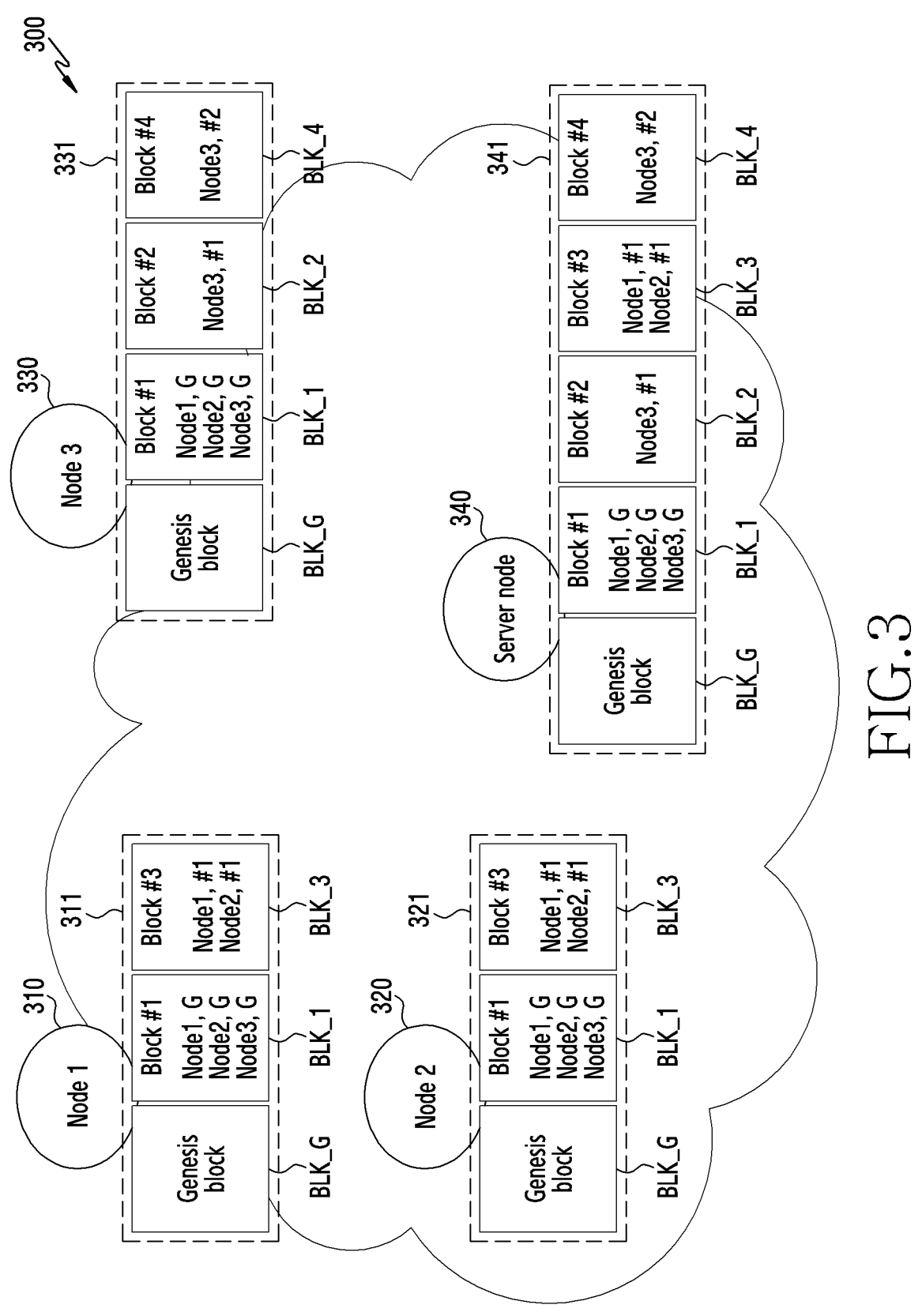
FIG. 3 illustrates a blockchain network including blockchain nodes storing a partial ledger or an entire ledger according to an embodiment of the disclosure.

FIG. 3 illustrates a blockchain network 300 including blockchain nodes storing a partial ledger or an entire ledger according to an embodiment of the disclosure.

Referring to FIG. 3, the blockchain network 300 (e.g., the blockchain network 200) may include a first node 310, a second node 320, and third node 330 including a partial ledger. In addition, the blockchain network 300 may include a server node 340 including an entire ledger 341. The electronic device 100, the first external device 210, the second external device 220, and the third external device 230 included in the blockchain network 200 described with reference to FIG. 2 may correspond to the first node 310, the second node 320, the third node 330, and the server node 340, respectively. Accordingly, each of the first to third nodes 310, 320, and 330 may have a block including a transaction associated with each of the first to third nodes 310, 320, and 330. For example, the first to third nodes 310, 320, and 330 may store a partial ledger including a block for a transaction in which each of the nodes has participated, in a memory of each of the devices. The server node 340 may include the entire ledger of the blockchain network 300.

The description of the multiple electronic devices 100, 210, 220, and 230 described with reference to FIG. 2 may be applied to the first to third nodes 310, 320, and 330 and the server node 340. Accordingly, a redundant description may be omitted.

The first node 310 and the second node 320 may be a block node of the same user. For example, the first node 310 and the second node 320 may be an electronic device of a first user. In addition, the third node 330 may be an electronic device of a second user that is distinguished from the first user.

When each of the multiple nodes 310, 320, 330, and 340 is initially executed, each node and a user of each node may be stored in the blockchain network 300. For example, when an operation related to a blockchain is initially executed, the first node 310 may execute a smart contract related to an initial operation. The first node 310 may load and execute the smart contract related to the initial operation. As the smart contract related to the initial operation, a contract for registering the first node 310 and a user of the first node 310 may be written in the blockchain network 300.

The server node 340 may associate (or map) a user with each of the first to third nodes 310, 320, and 330 and manage the same. A description of the server node 340 which associates the user with the first to third nodes 310, 320, and 330 and manages the first to third nodes 310, 320, and 330 is provided below with reference to FIG. 5.

The first node 310 may include a first partial ledger 311. The second node 320 may include a second partial ledger 321. In addition, the third node 330 may include a third partial ledger 331. The first to third partial ledgers 311, 321, and 331 may include at least one block including a transaction associated with nodes corresponding to the nodes, respectively. The transaction executed in the blockchain network 300 may be executed based on a user. Accordingly, the first partial leger 311 and the second partial ledger 321 corresponding to the first node 310 and the second node 320 may be identical to each other, the first node corresponding to the device of the first user. In addition, the third partial ledger 331 of the third node 330 corresponding to the device of the second user may be different from the first partial ledger 311 and the second partial ledger 321.

The server node 340 may include the entire ledger 341 of the blockchain network 300. The entire ledger 341 may include a genesis block BLK_G and first to fourth blocks BLK_1 to BLK_4 related to generation of the blockchain network 300. The entire ledger 341 may connect the genesis block BLK_G to the first to fourth blocks BLK_1 to BLK_4 and include the connected blocks as a blockchain.

The genesis block BLK_G and the first to fourth blocks BLK_1 to BLK_4 may be generated by performing a transaction generation operation, a transaction guaranteeing operation, a block generation operation, and a block generation consensus operation between the server node 340 and the first to third nodes 310, 320, and 330.

For example, the first node 310 and the second node 320 may be requested to perform generation and execution of a first transaction, based on execution of an application in a device or the first user. The first node 310 may execute the first smart contract for the first transaction in response to the request for the generation of the first transaction. According to an embodiment of the disclosure, a node to participate in the generation of the first transaction in the blockchain network 300 may be predetermined, or may be determined by a user request. The first node 310 may request, from the server node 340, user node information associated with the first transaction. In response to the request, the first node 310 may receive user node information associated with the first transaction from the server node 340.

The first node 310 may acquire a write-set including the user node information, through the first smart contract, based on the acquired user node information. The write-set may include data related to the first transaction and user node information associated with the first transaction. The write-set may include data to be stored in a state database upon the execution of the smart contract.

The first node 310 may operate a guaranteeing operation with other block nodes included in the blockchain network 330 in relation to the first transaction, and request generation of a block for the first transaction, from the server node 340. The first node 310 may transfer the first transaction data including the write-set and a read-set related to the execution of the first smart contract.

The server node 340 may generate a block, based on the first transaction data. The server node 340 may sort the transaction data in order, and generate and confirm a block by performing a guaranteeing operation for the block in order. The first node 310 may receive, from the server node 340, an updating request for the block generated based on the first transaction data. In response to the updating request, the first node 310 may update the block in the first partial ledger 311. For example, the first node 310 may store the block in a memory (e.g., the memory 110 of FIG. 1).

The write-set acquired based on the first smart contract may be recorded in the block including the first transaction. Accordingly, the user node information may be recorded in the block including the first transaction.

Through the operation above, the first node 310 and the second node 320 may participate in generation of the first block BLK_1 and the third block BLK_3. In addition, the third node 330 may participate in generation of the first block BLK_1, the second block BLK_2, and the third block BLK_4. Accordingly, the first node 310 and the second node 320 may include the first partial ledger 311 and the second partial ledger 321, respectively, wherein each ledger includes the genesis block BLK_G, the first block BLK_1, and the third block BLK_3. The third node 330 may include the third partial ledger 331 including the genesis block BLK_G, the first block BLK_1, the second block BLK_2, and the third block BLK_4.

The configuration of each of the genesis block BLK_G and the first to fourth blocks BLK_1 to BLK_4 according to various embodiments will be described below with reference to FIG. 4.

Figure 4:
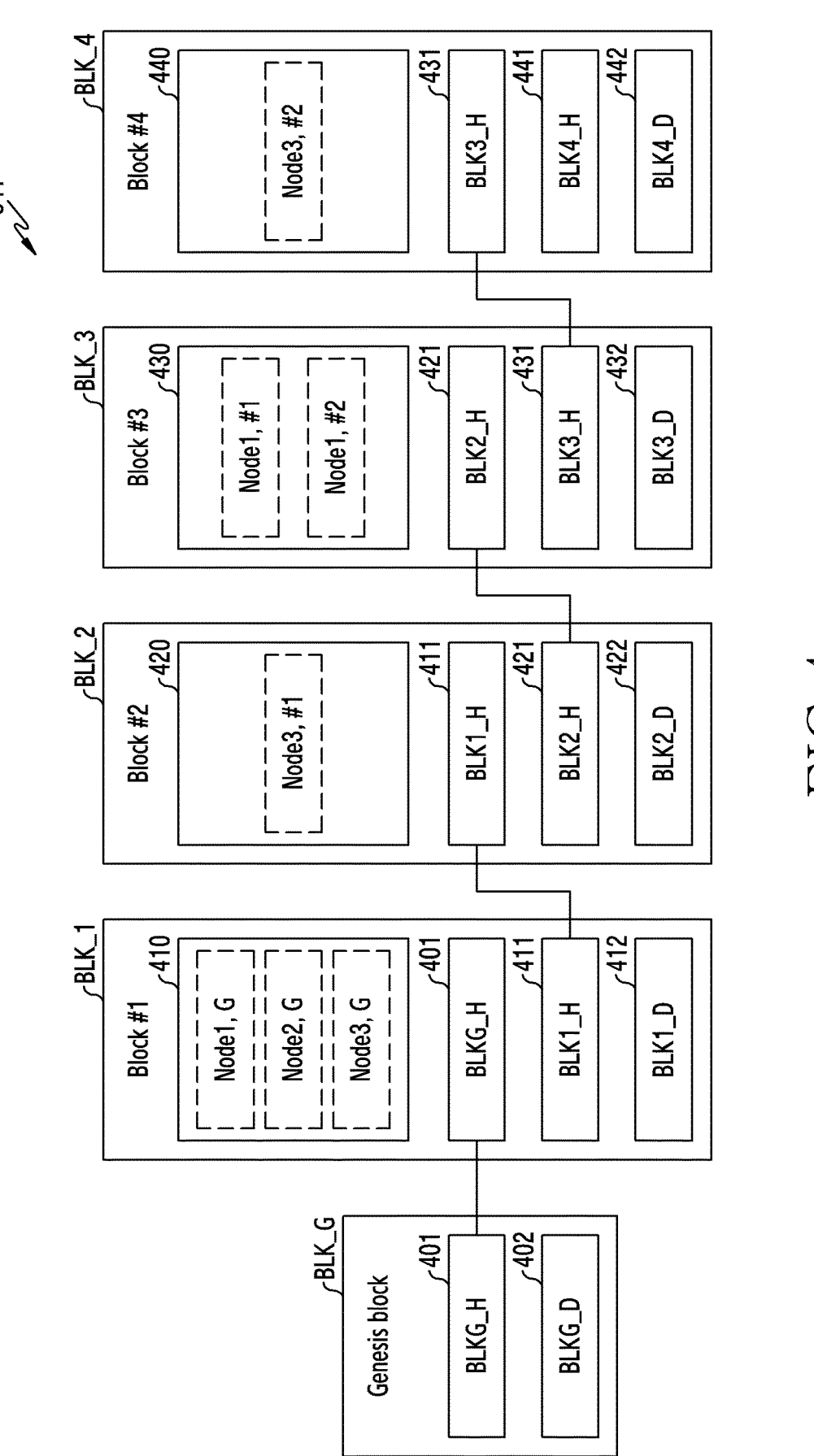
FIG. 4 illustrates a structure of an entire ledger stored in a server node according to an embodiment of the disclosure.

FIG. 4 illustrates a structure of an entire ledger 341 stored in a server node according to an embodiment of the disclosure.

Referring to FIG. 4, the entire ledger 341 may include the entirety of a distributed ledger for a blockchain network 300. The server node 340 included in the blockchain network 300 may include the entire ledger 341. The first to third nodes 310, 320, and 330 included in the blockchain network 300 may include a part of the entire ledger 341. For example, each of the first to third nodes 310, 320, and 330 may have a partial ledger including a block for a transaction associated with each of the nodes.

The entire ledger 341 may include a block and data related to all transactions in the blockchain network 300. For example, the entire ledger 341 may include a genesis block BLK_G related to a transactional initially executed in the blockchain network 300, and first to fourth blocks BLK_1 to BLK_4 related to execution of first to fourth transactions. For convenience of description, it is described that respective blocks are associated with one transaction, but the disclosure is not limited thereto, and each of the blocks may be related to execution of at least one transaction. For example, one block may include data of multiple transactions.

The genesis block BLK_G may include genesis block information 410 and genesis block data 402 for the corresponding block. The genesis block information 401 may be included in a block header described with reference to FIG. 1. The genesis block data 402 corresponds to block data described with reference to FIG. 1, and may include data related to a transaction initially executed in the blockchain network 300. For example, the genesis block data 402 may include data related to generation of the blockchain network 300.

Each of the first to fourth blocks BLK_1 to BLK_4 related block information including node information and previous block information in a partial ledger included in a node, information of a previous block in the entire ledger, a block header including the corresponding block information, and block data. Accordingly, each of the genesis block BLK_G and the first to fourth blocks BLK_1 to BLK_4 included in the entire ledger 341 may be connected through the previous block information.

The first block BLK_1 may include the genesis block information 401 corresponding to the previous block information in the entire ledger, and first block information 411. In addition, the block BLK_1 may include first block data 412 including transaction data associated with the first block BLK_1. The first block BLK_1 may include first related block information 410. The first related block information 410 may include node information of block nodes in the blockchain network 300 associated with generation of the first block BLK_1, and previous block information in the partial ledger included in each of the block nodes. For example, the first block BLK_1 may include first node information and genesis block information 401 corresponding to previous block information in the first partial ledger 311 of the first node 310. Similarly, the first block BLK_1 may include second node information and genesis block information 401 corresponding to previous block information in the second partial ledger 321 of the second node 310, and include third node information and genesis block information 401 corresponding to previous block information in the third partial ledger 331 of the third node 330.

Accordingly, the server node 340 may search for, in response to a block data request, block nodes (e.g., first to third nodes 310, 320, and 330) associated with the first block BLK_1 through the first related block information 410 in the entire ledger 341, and transmit the first block BLK_1 to the block nodes (e.g., the first to third nodes 310, 320, and 330) associated with the first block BLK_1.

The second block BLK_2 may include first block information 411 corresponding to previous block information in the entire ledger, and second block information 421. In addition, the second block BLK_2 may include second block data 422 including transaction data associated with the second block BLK_2. The second block BLK_2 may include second related block information 420. The second related block information 420 may include node information for block nodes in the blockchain network 300 associated with generation of the second block BLK_2, and previous block information in the partial ledger included in each of the block nodes. For example, the second block BLK_2 may include third node information and first block information 411 corresponding to previous block information in the third partial ledger 331 of the third node 330.

Accordingly, the server node 340 may search for, in response to a block data request, a block node (e.g., a third node 330) associated with the second block BLK_2 through second related block information 420 in the entire ledger 341, and transmit the second block BLK_2 to the block node (e.g., the third node 330) associated with the second block BLK_2.

The third block BLK_3 may include second block information 421 corresponding to previous block information in the entire ledger, and third block information 431. In addition, the third block BLK_3 may include third block data 432 including transaction data associated with the third block BLK_3. The third block BLK_3 may include third related block information 430. The third related block information 430 may include node information of block nodes in the blockchain network 300 associated with generation of the third block BLK_3, and previous block information in the partial ledger included in each of the block nodes. For example, the third block BLK_3 may include first node information and first block information 411 corresponding to previous block information in the first partial ledger 311 of the first node 310. Similarly, the third block BLK_3 may include second node information and first block information 411 corresponding to previous block information in the second partial ledger 321 of the second node 320.

Accordingly, the server node 340 may search for, in response to a block data request, block nodes (e.g., the first node 310 and the second node 320) associated with the third block BLK_3 through the third related block information 430 in the entire ledger 341, and transmit the third block BLK_3 to the block nodes (e.g., the first node 310 and the second node 320) associated with the third block BLK_3.

The fourth block BLK_4 may include third block information 431 corresponding to previous block information in the entire ledger, and fourth block information 441. In addition, the fourth block BLK_4 may include fourth block data 442 including transaction data associated with the fourth block BLK_4. The fourth block BLK_4 may include fourth related block information 440. The fourth related block information 440 may include node information of block nodes in the blockchain network 300 associated with generation of the fourth block BLK_4, and previous block information in the partial ledger included in each of the block nodes. For example, the fourth block BLK_4 may include third node information and second block information 421 corresponding to previous block information in the third partial ledger 331 of the third node 330.

Accordingly, the server node 340 may search for, in response to a block data request, a block node (e.g., a third node 330) associated with the fourth block BLK_4 through fourth related block information 440 in the entire ledger 341, and transmit the fourth block BLK_4 to block nodes (e.g., the third node 330) associated with the fourth block BLK_4.

For convenience of description, the fourth block BLK_4 is described but the disclosure is not limited thereto, and the entire ledger 341 may include various blocks. In addition, the entire ledger 341 is not limited to FIG. 4, and may include various data including related block information, in each block.

Figure 5:
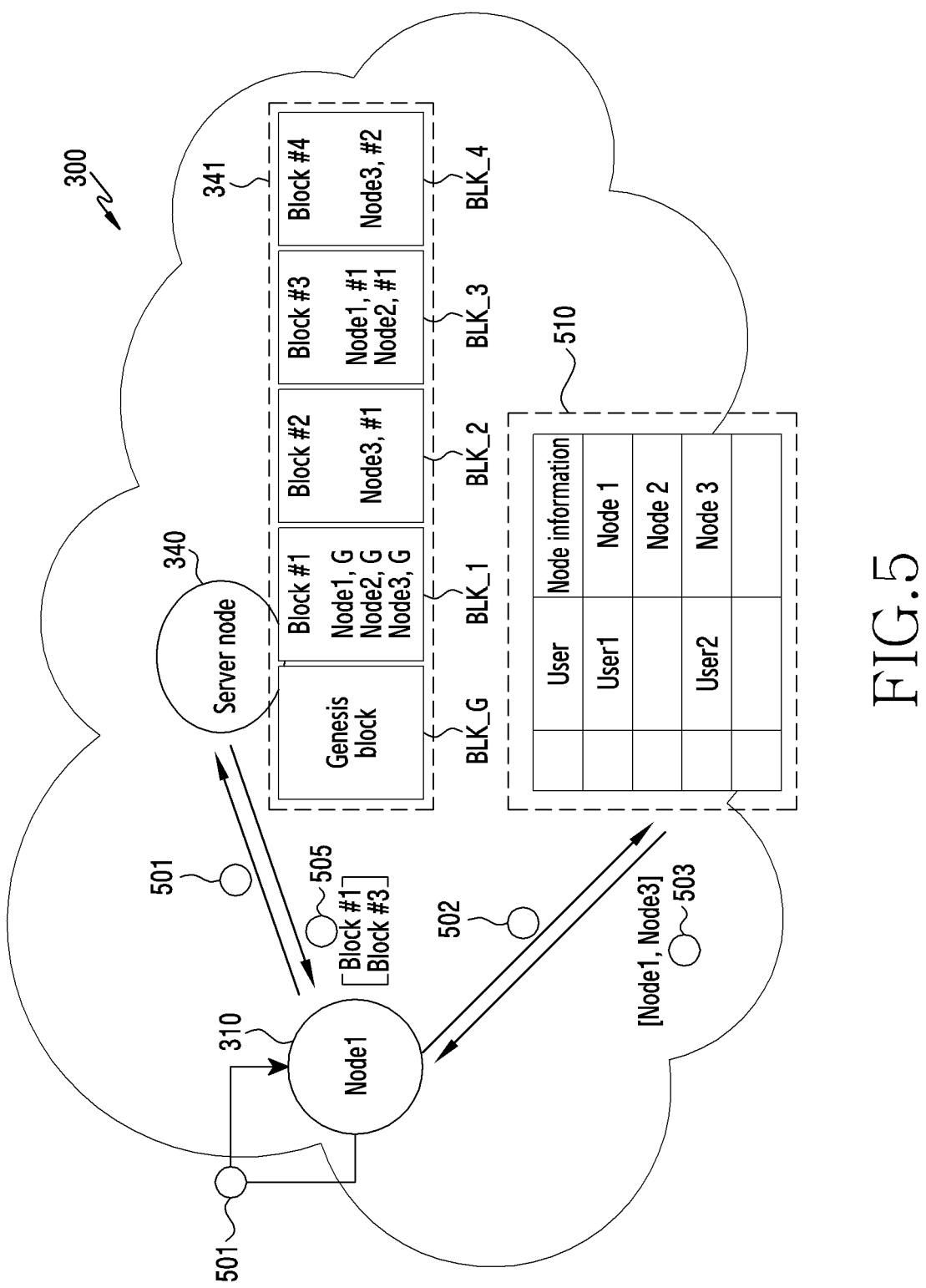
FIG. 5 illustrates an operation of recovering lost data through a server node by an electronic device according to an embodiment of the disclosure.

FIG. 5 illustrates an operation of recovering lost data through a server node by an electronic device according to an embodiment of the disclosure.

Referring to FIG. 5, when being executed, a first node 310 (e.g., the electronic device 100) may perform a block data recovery in operation 501. The first node 310 may identify whether blockchain-related data stored in a memory (e.g., the memory 110) is the latest data. For example, the first node 310 may identify whether a first partial ledger 311 stored in the memory is the latest data through a server node 340. The first node 310 may receive, from the server node 340, information on the last block number related to the first node 310, based on block node information corresponding to the first node 310, and identify whether the blockchain-related data stored in the first node 310 is the latest data, based on the received block number information. When the blockchain-related data stored in the memory of the first node 310 is not the latest data, the data may be represented as lost data.

In another example, in executing a smart contract for the transaction in response to a transaction generation request, the first node 310 may identify that at least a part of data included in a first partial ledger 311 included in the first node 310 is lost.

The first node 310 may perform, in response to the identification of the data loss, an operation of requesting user node information from the server node 340 (e.g., the third external device 330) in operation 502.

The server node 340 may include an entire ledger 341 and node identification information 510. The node identification information 510 may include block node information associated with (e.g., mapped to) user information registered in a blockchain network 300. For example, a user registered in the blockchain network 300 may be a first user and a second user. In addition, a block node of the first user may correspond to a first node 310 or a second node 320, and a block node of the second user may correspond to a third node 330. Any unique value capable of specifying a block node in the blockchain network 300 may be represented node information, without limitation on the type. For example, the node information may be one of various unique values of the block node. The node information may also include one of address information of the block node, public key information of the block node, and universally unique identifier (UUID) information of the block node. The node information may be included in the node identification information 510 in association with the user information of the corresponding block node. Accordingly, when a user is identified, a block node registered by the corresponding user in the blockchain network 300 may be determined through the node identification information 510. For example, a device registered as a block node by the user may be determined.

In response to the user node information request of the first node 310 in operation 502, the server node 340 may transmit information on the block node registered by the user of the first node 310 in operation 503. For example, the server node 340 may transmit, to the first node 310, user node information including first node information and second node information, which correspond to information on the block node registered by the first user of the first node 310, based on the node identification information 510.

The first node 310 may request block data from the server node 340, based on the user node information (the first node information 310 and the second node information 320) acquired from the server node 340 (operation 504). For example, the first node 310 may request block data to be stored in the first partial ledger 311, from the server node 340.

In response to the block data request of the first node 310, the server node 340 may transmit block data related to the first node 310 to the first node 310. The server node 340 may detect at least one block for the first node 310, from among one or more blocks included in the entire ledger 341, and transmit the detected at least one block to the first node 310.

To detect the at least one block for the first node 310, the server node 340 may utilize node information included in each of first to fourth blocks BLK_1 to BLK_4. For example, to detect at least one block associated with the first node 310, the server node 340 may detect a bock including first node information, from among the first to fourth blocks BLK_1 to MLK_4. Accordingly, the first block BLK_1 and the third block BLK_3 for which the first node 310 has participated in block generation.

The server node 340 may transmit block data including the first block BLK_1 and the third block BLK_3 acquired based on node information included in each of the first to fourth blocks BLK_1 to BLK_4, to the first node 310 in operation 505.

The first node 310 having received the block data from the server node 340 may update the first partial ledger 311, based on the received block. For example, the first node 310 may store, in the first partial ledger 311, a blockchain connecting the first block BLK_1 and the third block BLK_3 acquired from the server node 340, and update a state database, based on the first block BLK_1 and the third block BLK_3.

Communication between block nodes included in the blockchain network 300 may be performed through a relay server. For example, to transmit or receive data, the first node 310 and the server node 340 may generate a security connection through the relay server, and transmit or receive data through the security connection. The relay server may generate a connection between nodes for which verification of non-falsification has been made. For example, the relay server may generate a security connection between nodes including a certificate (e.g., a certificate issued by a certificate authority (CA)) which certifies that electronic devices constituting a block node have not been falsified.

FIG. 6 is a flowchart 600 illustrating an operation of recovering lost block data by an electronic device according to an embodiment of the disclosure.

Referring to FIG. 6, in operation 601, a processor 130 may request, in response to loss of data stored in a memory 110, user node information of a user of the electronic device 100 from an external device (e.g., a server node 340). For example, while a smart contract is being executed, the processor 130 may identify that blockchain-related data stored in the memory 110 has been lost. Accordingly, to recover the lost data, the processor may request user node information from the external device. According to an embodiment, the external device may include an entire ledge 341 and node identification information 510.

In operation 603, the processor 130 may acquire user node information from the external device. For example, the external device may determine user information of the electronic device 100 and transmit the user node information associated with the user, based on the node identification information 510 stored in the external device.

In a process of generating a blockchain network, the user may perform a registration process by using an electronic device (e.g., the first node 310 of FIG. 3) of the user. For example, the user may generate an access token by using an electronic device to be registered in the blockchain network, and encrypt the token by using a key generated by the electronic device to store the same in a distributed ledger of the blockchain network. In addition, the user may register an electronic device (e.g., the second node 320 of FIG. 3) other than the electronic device in the blockchain network. For example, the user may generate the access token by using a specific service (e.g., a terminal management service of the blockchain network). The user may encrypt the access token by using a key generated by another electronic device and store the same in the distributed ledger.

The distributed ledger may include user information of the blockchain network and an access token encrypted by a key generated by each of the electronic device and/or another electronic device. The user information may indicate information on a user who owns the access token. For example, the user information may include an ID of a user who owns the access token. The electronic device and another electronic device, which correspond to block nodes in the blockchain network, may indicate a terminal which can use the access token.

The user node information may include information (e.g., Android ID, imei, and a serial number) of the electronic device in association with the user information.

In operation 605, the processor 130 may request block data associated with the user from the external device, based on the acquired user node. For example, the processor 130 may request block data for which the electronic device 100 has participated in block generation, from the external device.

In operation 607, the processor 130 may acquire at least one block detected based on node information among the entire ledger 341, from the external device. Each of the at least one block included in the entire ledger 341 may include node information indicating information on a block node having participated in generation of the corresponding block. Accordingly, the external device may detect at least one block associated with the electronic device 100 from the at least one block included in the entire ledger 341, based on node information included in the block. For example, when the electronic device 100 has participated in generation of a first block and a third block, the external device may transmit, to the electronic device 100, the first block and the third block including node information of the electronic device 100, from the at least one block included in the entire ledger 341.

According to an embodiment, in operation 609, the processor 130 may store at least one block acquired from the external device, in the memory 110. For example, the processor 130 may store the at least one block acquired from the external device in a partial ledger (e.g., the first partial ledger 311) stored in the memory 110. For example, the processor 130 may store the at least one block in connection with a blockchain included in the partial ledger. In addition, the processor 130 may update a state database, based on the at least one block. For example, the processor may store transaction data corresponding to each of the at least one block in the state database.

Figure 7:
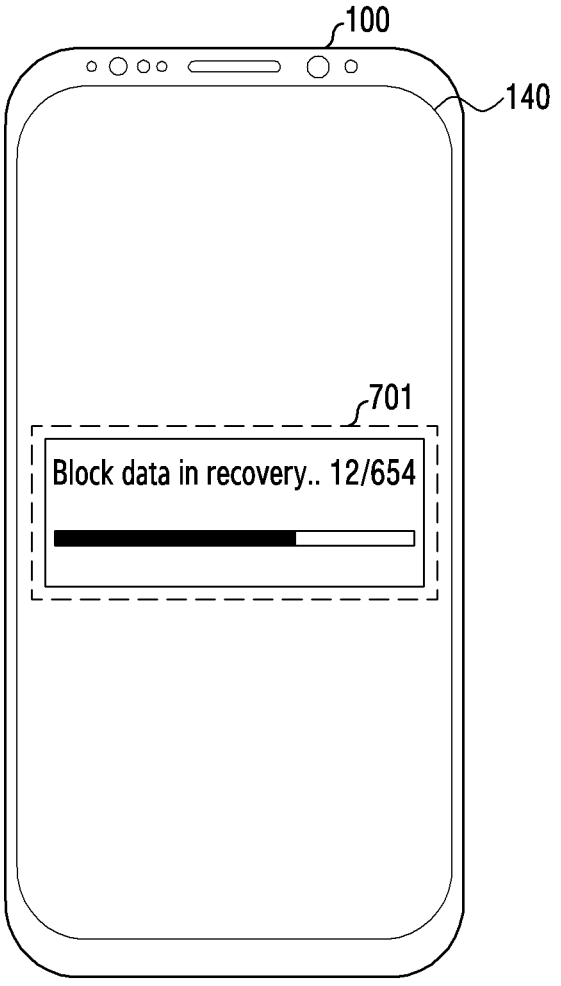
FIG. 7 illustrates a user interface (UI) for block data recovery, the UI being indicated on a display, by an electronic device according to an embodiment of the disclosure.

FIG. 7 illustrates a UI for block data recovery, the UI being indicated on a display, by an electronic device according to an embodiment of the disclosure.

Referring to FIG. 7, an electronic device 100 may include a display 140. The processor 130 may determine that block data has been lost. For example, the processor 130 may determine that data of a partial ledger stored in a memory 110 has been lost while a start contract is being executed in response to a transaction generation request. In another example, the processor 130 may search for a block node registered by a user of the electronic device 100 through the smart contract when the electronic device 100 executes a blockchain-related operation. In some cases, the processor 130 may fail to perform the operation of searching for the block node registered by the user, or fail to find the block node registered by the user, and thus determine that the block data has been lost.

When determining that the block data has been lost, the processor 130 may perform an operation related to block data recovery and output a notification of the operation. For example, the processor 130 may display a notification 701 indicating that the block data is being recovered, through the display 140. The notification 701 may include a visual object indicating the degree of recovery together with display of the block data that is being recovered.

The embodiments of the disclosure is not limited to the described example; the processor 130 and may provide a notification related to block data recovery through various methods. In addition, in performing a blockchain-related operation, the processor 130 may provide a notification for the operation through various configurations of the electronic device 100.

As described above, an electronic device (e.g., the electronic device 100 of FIG. 1) constituting a block node included in a blockchain network, according to various embodiments of the disclosure, may include a communication circuit (e.g., the communication circuit 120 of FIG. 1) configured to transmit or receive a signal to or from an external device having an entire ledger for the blockchain network, wherein the entire ledger includes at least one block including node information relating to at least one block node included in the blockchain network, the at least one block node having consented to block generation, a memory (e.g., the memory 110 of FIG. 1), and at least one processor (e.g., the processor 130 of FIG. 1) electrically connected to the communication circuit and the memory, wherein in response to a request for recovery of loss of data stored in the memory, the processor requests user node information relating to a user of the electronic device from the external device through the communication circuit, receives the user node information acquired based on node identification information stored in the external device, requests block data associated with the user from the external device, based on the user node information, acquires at least one block detected based on the node information, among the entire ledger, from the external device through the communication circuit, and stores the at least one acquired block in the memory.

The entire ledger may include a blockchain including a block corresponding to at least one transaction generated in the blockchain network and a state database of the blockchain network.

The at least one processor may store, in the memory, a partial ledger including at least a part of the entire ledger.

When executing a first smart contract for a first transaction in response to a request for generating the first transaction, the at least one processor may identify that at least a part of data included in the partial ledger has been lost, and request the user node information from the external device through the communication circuit.

At least one block may include related block information, and the related block information may include the node information and previous block information in the partial ledger.

The at least one processor may connect the at least one block to a blockchain included in the partial ledger, based on the previous block information in the partial ledger.

The node identification information may include user information relating to each of the at least one block node, the user information being associated with a unique value of each of the at least one block node.

The at least one processor may execute, in response to initial execution of a blockchain-related operation by the electronic device, a smart contract related to an initial operation, and the smart contract related to the initial operation may include a contract for registration of a user of the electronic device and the electronic device in the blockchain network.

The at least one processor may generate a security connection with the external device through a relay server, and transmit or receive data through the security connection, and the relay server may generate a connection between devices for which verification of non-falsification has been made.

The electronic device may further include a display (e.g., the display 140 of FIG. 1), wherein the at least one processor displays, in response to the loss of the data stored in the memory, a notification of recovery of the block data.

When executing a second smart contract for a second transaction in response to a request for generating the second transaction, the at least one processor may request user node information associated with the second transaction from the external device, receive the user node information associated with the second transaction from the external device, and generate a write-set to be stored in the memory through the second smart contract, based on the user node information associated with the second transaction.

The write-set may include data related to the second transaction and the user node information associated with the second transaction.

The at least one processor may transfer, to the external device, second transaction data including the write-set and a read-set related to the execution of the second smart contract.

The at least one processor may receive an updating request for a block generated based on the second transaction data, and store the block in the memory in response to the updating request.

As described above, a method for operating an electronic device (e.g., the electronic device 100 of FIG. 1) constituting a block node included in a blockchain network, according to various embodiments of the disclosure, may include, in response to a request for recovery according to loss of data stored in a memory (e.g., the memory 110 of FIG. 1) included in the electronic device, requesting user node information relating to the electronic device from an external device, receiving the user node information acquired based on node identification information stored in the external device, requesting block data associated with a user from the external device, based on the user node information, acquiring at least one block detected based on the node information, among an entire ledger of the blockchain network, from the external device, wherein the entire ledger includes the node information relating to at least one block node included in the blockchain network, the at least one block node having consented to block generation, and storing the at least one block in the memory.

The memory may store a partial ledger including at least a part of the entire ledger, the part being associated with the user, and the method for operating the electronic device may further include, in response to a request for generating a first transaction, when executing a first smart contract for the first transaction, identifying that at least a part of data included in the partial ledger has been lost, and in response to the identification, requesting the user node information from the external device.

Each of the at least one block may include related block information, and the related block information may include the node information and previous block information in the partial ledger.

The method for operating the electronic device may further include in response to initial execution of a blockchain-related operation by the electronic device, executing a smart contract related to an initial operation, and registering the user and the electronic device in the blockchain network through the smart contract related to the initial operation.

The method for operating the electronic device may further include generating a security connection with the external device through a relay server, and transmitting or receiving data through the security connection, wherein the relay server generates a connection between devices for which verification of non-falsification has been made.

The method for operating the electronic device may further include providing a notification of recovery of the block data through an output device included in the electronic device in response to the loss of the data stored in the memory.

The method for operating the electronic device may include generating an access token. The method for operating the electronic device may include encrypting the access token. The method for operating the electronic device may include storing the access token in the entire ledger.

The access token may be generated by a specific service of the blockchain network.

The access token may be encrypted using a key generated by another electronic device.

Figure 8:
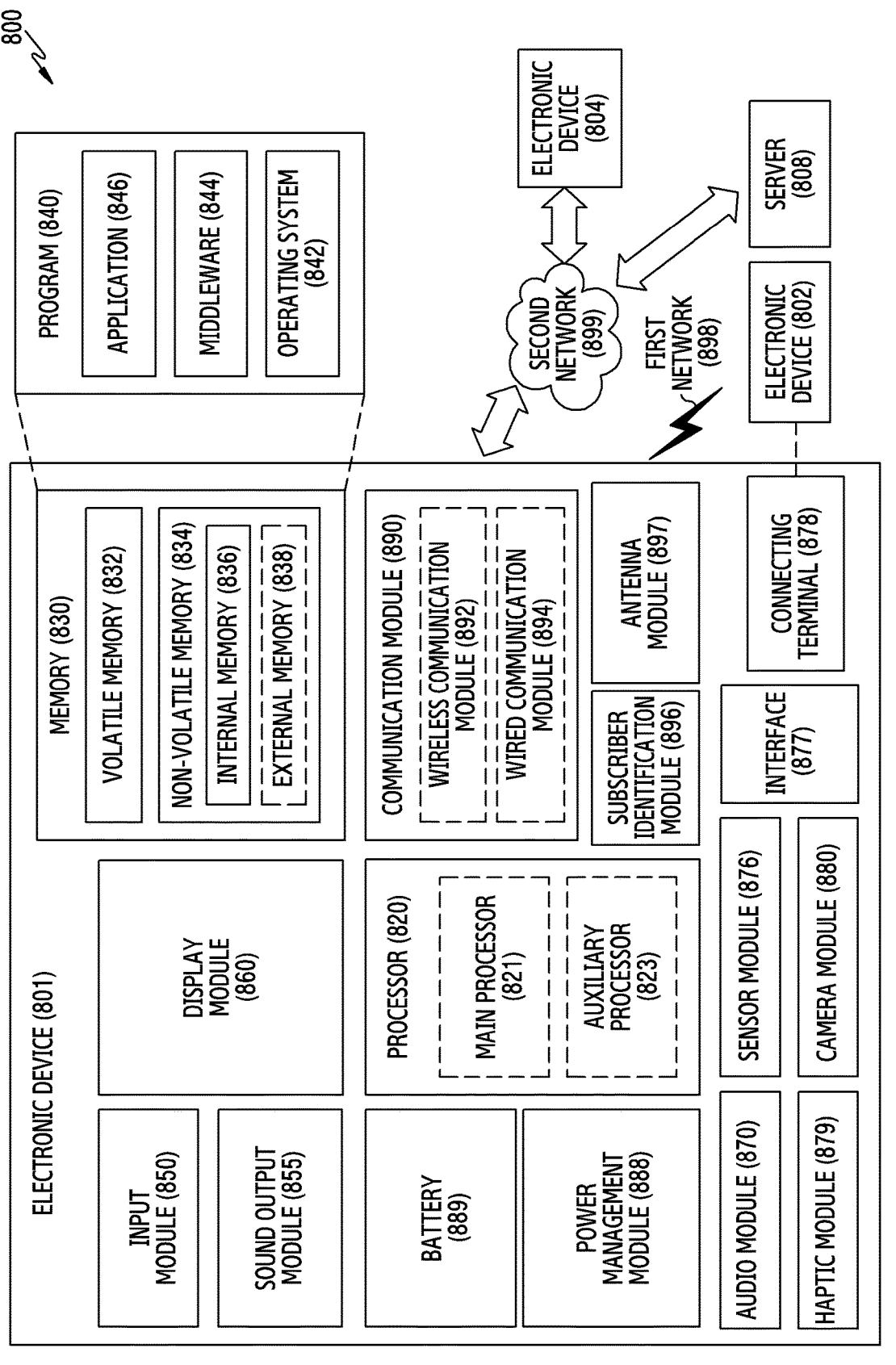
FIG. 8 is a block diagram illustrating an electronic device in a network environment according to an embodiment of the disclosure.

FIG. 8 is a block diagram illustrating an electronic device 801 in a network environment 800 according to an embodiment of the disclosure.

Referring to FIG. 8, the electronic device 801 in the network environment 800 may communicate with an electronic device 802 via a first network 898 (e.g., a short-range wireless communication network), or at least one of an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input module 850, a sound output module 855, a display module 860, an audio module 870, a sensor module 876, an interface 877, a connecting terminal 878, a haptic module 879, a camera module 880, a power management module 888, a battery 889, a communication module 890, a subscriber identification module (SIM) 896, or an antenna module 897. In some embodiments, at least one of the components (e.g., the connecting terminal 878) may be omitted from the electronic device 801, or one or more other components may be added in the electronic device 801. In some embodiments, some of the components (e.g., the sensor module 876, the camera module 880, or the antenna module 897) may be implemented as a single component (e.g., the display module 860).

The processor 820 may execute, for example, software (e.g., a program 840) to control at least one other component (e.g., a hardware or software component) of the electronic device 801 coupled with the processor 820, and may perform various data processing or computation. According to one embodiment, as at least part of the data processing or computation, the processor 820 may store a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), or an auxiliary processor 823 (e.g., a graphics processing unit (GPU), a neural processing unit (NPU), an image signal processor (ISP), a sensor hub processor, or a communication processor (CP)) that is operable independently from, or in conjunction with, the main processor 821. For example, when the electronic device 801 includes the main processor 821 and the auxiliary processor 823, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display module 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823. According to an embodiment, the auxiliary processor 823 (e.g., the neural processing unit) may include a hardware structure specified for artificial intelligence model processing. An artificial intelligence model may be generated by machine learning. Such learning may be performed, e.g., by the electronic device 801 where the artificial intelligence is performed or via a separate server (e.g., the server 808). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input module 850 may receive a command or data to be used by another component (e.g., the processor 820) of the electronic device 801, from the outside (e.g., a user) of the electronic device 801. The input module 850 may include, for example, a microphone, a mouse, a keyboard, a key (e.g., a button), or a digital pen (e.g., a stylus pen).

The sound output module 855 may output sound signals to the outside of the electronic device 801. The sound output module 855 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 860 may visually provide information to the outside (e.g., a user) of the electronic device 801. The display module 860 may include, for example, a display, a hologram device, or a projector and control circuitry to control a corresponding one of the display, hologram device, and projector. According to an embodiment, the display module 860 may include a touch sensor adapted to detect a touch, or a pressure sensor adapted to measure the intensity of force incurred by the touch.

The audio module 870 may convert a sound into an electrical signal and vice versa. According to an embodiment, the audio module 870 may obtain the sound via the input module 850, or output the sound via the sound output module 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, an SD card connector, or an audio connector (e.g., a headphone connector).

The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or infrared data association (IrDA)) or the second network 899 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The wireless communication module 892 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 892 may support a high-frequency band (e.g., the millimeter wave (mmWave) band) to achieve, e.g., a high data transmission rate. The wireless communication module 892 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 892 may support various requirements specified in the electronic device 801, an external electronic device (e.g., the electronic device 804), or a network system (e.g., the second network 899). According to an embodiment, the wireless communication module 892 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 897 may transmit or receive a signal or power to or from the outside (e.g., the external electronic device) of the electronic device 801. According to an embodiment, the antenna module 897 may include an antenna including a radiating element composed of a conductive material or a conductive pattern formed in or on a substrate (e.g., a printed circuit board (PCB)). According to an embodiment, the antenna module 897 may include a plurality of antennas (e.g., array antennas). In such a case, at least one antenna appropriate for a communication scheme used in the communication network, such as the first network 898 or the second network 899, may be selected, for example, by the communication module 890 (e.g., the wireless communication module 892) from the plurality of antennas. The signal or the power may then be transmitted or received between the communication module 890 and the external electronic device via the selected at least one antenna. According to an embodiment, another component (e.g., a radio frequency integrated circuit (RFIC)) other than the radiating element may be additionally formed as part of the antenna module 897.

According to various embodiments, the antenna module 897 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 or 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, mobile edge computing (MEC), or client-server computing technology may be used, for example. The electronic device 801 may provide ultra low-latency services using, e.g., distributed computing or mobile edge computing. In another embodiment, the external electronic device 804 may include an internet-of-things (IoT) device. The server 808 may be an intelligent server using machine learning and/or a neural network. According to an embodiment, the external electronic device 804 or the server 808 may be included in the second network 899. The electronic device 801 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to embodiments of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device constituting a first block node included in a blockchain network, the electronic device comprising:

a communication circuitry configured to transmit or receive a signal to or from an external device having an entire ledger for the blockchain network, and node identification information about mapping between a plurality of users registered in the blockchain network and a plurality of block nodes registered with the plurality of users, wherein the entire ledger comprises at least one block comprising node information relating to at least one block node included in the blockchain network, the at least one block node having consented to block generation;

memory, comprising one or more storage media, storing instructions; and at least one processor communicatively coupled to the communication circuitry and the memory, wherein the instructions, when executed by the at least one processor, cause the electronic device to:

execute a smart contract for registering a user of the electronic device and the electronic device together in the blockchain network, receive a request for generating a first transaction, execute a first smart contract for the first transaction in response to the request, store, in the memory, a partial ledger comprising at least a part of the entire ledger, wherein the at least a part of the entire ledger comprises a first block including the first transaction, identify that at least a part of data included in the partial ledger is lost, and in response to a request for recovery of the at least a part of data:

request user node information about at least one block node registered with the user of the electronic device from the external device through the communication circuitry, wherein the at least one block node comprises the first block node, and the user node information comprises first node information about the first block node, receive the user node information acquired based on the node identification information stored in the external device, request block data associated with the first block node from the external device, based on the user node information comprising the first node information about the first block node, acquire at least one block which is detected in the entire ledger based on the first node information, by receiving the block data from the external device through the communication circuitry, and store, for the partial ledger, the acquired at least one block in the memory.

2. The electronic device of claim 1, wherein the entire ledger comprises a blockchain comprising a block corresponding to at least one transaction generated in the blockchain network and a state database of the blockchain network.

3. The electronic device of claim 1, wherein the at least one block comprises related block information, and wherein the related block information comprises the node information and previous block information in the partial ledger.

4. The electronic device of claim 3, wherein the instructions, when executed by the at least one processor, further cause the electronic device to connect the at least one block to a blockchain included in the partial ledger, based on the previous block information in the partial ledger.

5. The electronic device of claim 1, wherein the node identification information comprises user information relating to each of the at least one block node, the user information being associated with a unique value of each of the at least one block node.

6. The electronic device of claim 1, wherein the smart contract is executed in response to initial execution of a blockchain-related operation by the electronic device, the smart contract being related to an initial operation.

7. The electronic device of claim 1, wherein the instructions, when executed by the at least one processor, further cause the electronic device to:

generate a security connection with the external device through a relay server, and transmit or receive data through the security connection, and wherein the relay server is configured to generate a connection between devices for which verification of non-falsification is made.

8. The electronic device of claim 1, further comprising:

a display, wherein the instructions, when executed by the at least one processor, further cause the electronic device to display, in response to the loss of the at least a part of data included in the partial ledger, a notification of recovery of the block data.

9. The electronic device of claim 1, wherein the user node information is first user node information, and the instructions, when executed by the at least one processor, further cause the electronic device to, when executing a second smart contract for a second transaction in response to a request for generating the second transaction:

request second user node information associated with the second transaction from the external device, receive the second user node information associated with the second transaction from the external device, and generate a write-set to be stored in the memory through the second smart contract, based on the second user node information associated with the second transaction.

10. The electronic device of claim 9, wherein the write-set comprises data related to the second transaction and the second user node information associated with the second transaction.

11. The electronic device of claim 9, wherein the instructions, when executed by the at least one processor, further cause the electronic device to transfer, to the external device, second transaction data comprising the write-set and a read-set related to the execution of the second smart contract.

12. The electronic device of claim 11, wherein the instructions, when executed by the at least one processor, further cause the electronic device to:

receive an updating request for a block generated based on the second transaction data, and store the generated block in the memory in response to the updating request.

13. The electronic device of claim 1, wherein a second block node is one of the at least one block node relating to the user, wherein the user node information further comprises second node information about the second block node, and wherein the instructions, when executed by the at least one processor, cause the electronic device to:

request the block data by requesting the block data associated with the first block node and the second block node from the external device, based on the user node information comprising the first node information and the second node information, acquire the at least one block which is detected in the entire ledger based on the first node information and the second node information, by receiving the block data.

14. A method for operating an electronic device constituting a first block node included in a blockchain network, the method comprising:

receiving, by the electronic device, a request for generating a first transaction;

executing, by the electronic device, a first smart contract for the first transaction in response to the request;

storing, in memory of the electronic device, a partial ledger comprising at least a part of an entire ledger for the blockchain network stored at an external device, wherein the external device stores node identification information about mapping between a plurality of users registered in the blockchain network and a plurality of block nodes registered with the plurality of users, and the entire ledger comprises at least one block comprising node information relating to at least one block node included in the blockchain network, the at least one block node having consented to block generation;

executing a smart contract for registering a user of the electronic device and the electronic device together in the blockchain network;

identifying, by the electronic device, that at least a part of data included in the partial ledger is lost; and in response to a request for recovery of the at least a part of data:

requesting, by the electronic device, user node information about at least one block node registered with the user of the electronic device from the external device, wherein the at least one block node comprises the first block node, and the user node information comprises first node information about the first block node;

receiving, by the electronic device, the user node information acquired based on the node identification information stored in the external device;

requesting, by the electronic device, block data associated with the first block node from the external device, based on the user node information comprising the first node information about the first block node;

acquiring, by the electronic device, at least one block which is detected in the entire ledger based on the first node information, by receiving the block data from the external device; and storing, by the electronic device, the acquired at least one block in the memory for the partial ledger.

15. The method of claim 14, wherein each of the at least one block comprises related block information, and wherein the related block information comprises the node information and previous block information in the partial ledger.

16. The method of claim 3, wherein a smart contract is executed in response to initial execution of a blockchain-related operation by the electronic device, the smart contract being related to an initial operation, and wherein the smart contract comprises a contract for registration of the user and the electronic device in the blockchain network through the smart contract related to the initial operation.

17. The method of claim 14, further comprising:

generating a security connection with the external device through a relay server; and transmitting or receiving data through the security connection, wherein the relay server generates a connection between devices for which verification of non-falsification is made.

18. The method of claim 14, further comprising:

providing a notification of recovery of the block data through an output device included in the electronic device in response to the loss of the at least a part of data included in the partial ledger.

19. The method of claim 14, wherein a second block node is one of the at least one block node relating to the user, wherein the user node information further comprises second node information about the second block node, wherein the requesting of the block data comprises:

requesting, by the electronic device, the block data associated with the first block node and the second block node from the external device, based on the user node information comprising the first node information and the second node information, and wherein the acquiring the at least one block comprises:

acquiring, by the electronic device, the at least one block which is detected in the entire ledger based on the first node information and the second node information, by receiving the block data.

* * * * *